United States Patent Office 3,361,832
Patented Jan. 2, 1968

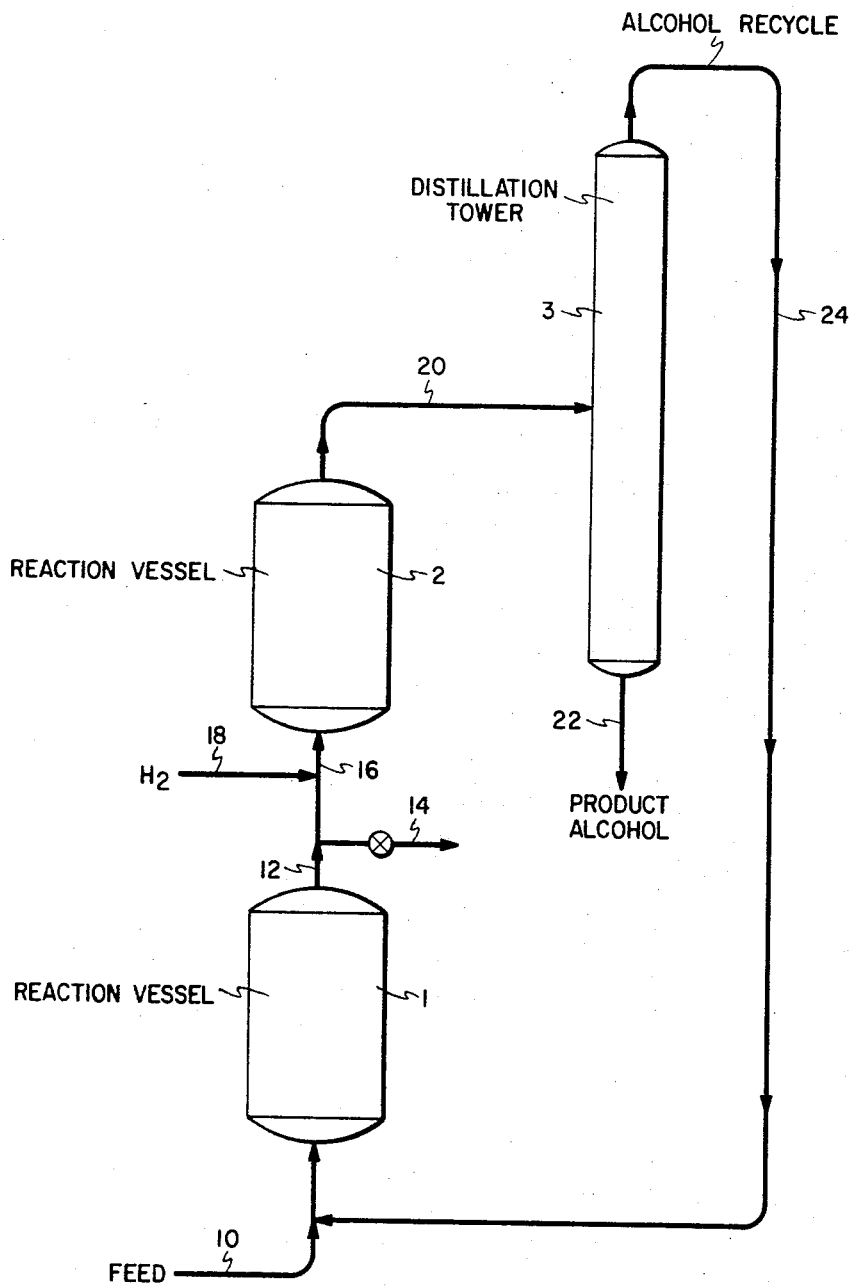

3,361,832
CONVERSION OF ACIDS TO ALCOHOLS
Lloyd Albert Pine and Henry George Ellert, Baton Rouge, La., assignors to Esso Research and Engineering Company, a corporation of Delaware
Filed Aug. 13, 1963, Ser. No. 301,814
5 Claims. (Cl. 260—638)

This invention relates to an improved process for the conversion of acids to alcohols. More particularly this invention relates to a two-stage process in which a carboxylic acid is reacted over a certain catalyst; in the first stage with a low molecular weight monohydroxy alcohol and in the second stage with hydrogen.

Heretofore it has been known to the prior art that the carboxyl group of fatty acids is accessible to reduction and such reduction can lead to the production of alcohols substantially corresponding in structure, number of carbon atoms, etc. to the starting fatty acid. Thus, it has been proposed to reduce the carboxyl group of fatty acids at high pressure over suitable catalysts with the formation of alcohols corresponding to the acids employed. The state of the art in this regard, however, shows that certain inherent disadvantages are present in the known processes. For example, the known processes for the reduction of organic acids to alcohols are generally characterized by reaction rates which are relatively low and produce yields of the desired alcohols in less than satisfactory amounts. In addition, when high conversion is attainable, the processes of the prior art are limited in that considerable amounts of the alcohol and/or acid are degraded to hydrocarbons. Further, the processes of the prior art are somewhat limited in the production of alcohols from carboxylic acids, which acids are branched in nature, for example, branched acids referred to as the "Koch" or "neo acids."

It is an object of the present invention, therefore, to provide an improved process for the production of alcohols from carboxylic acids. It is a special object to provide a process for the production of alcohols from carboxylic acids wherein said process has improved reaction rates and improved selectivity relative to the processes known to the prior art. Other objects will appear hereinafter.

Broadly the objects of this invention are accomplished by the following two-stage process in which a suitable carboxylic acid is reacted over a molybdenum-containing catalyst in each of said two stages. In the first stage the acid is reacted with a suitable low molecular weight monohydroxy alcohol and in the second stage the esterified product resulting from the first stage is reacted with hydrogen. In this second stage the low molecular weight alcohol is regenerated and subsequently recycled as hereinlater illustrated in the figure.

In general, any organic acid, or its anhydride can be suitably employed, i.e., reacted with the alcohol reactant in the first stage to produce the alcohols of the present invention. Organic acids containing substituent groups such as hydroxy groups and halogen atoms, etc. are also applicable herein. The organic acid reactant can be branched-chain, straight-chain, or cyclic; it can be a saturated or unsaturated organic acid. Similarly, such acid may be an aliphatic or aromatic, monobasic, dibasic, tribasic, etc. acid. Accordingly, when the term "organic acid" is used herein, it must be clearly understood that the term embraces organic acids and organic acid anhydrides. Thus, the organic acids suitable for use in the process of the present invention are the organic acids, for example, the saturated aliphatic monocarboxylic acids, saturated aliphatic dicarboxylic acids, aromatic acids, hydroxy acids, amino acids and the like, having from 1 to about 30 carbon atoms and preferably those having from 3 to 20 carbon atoms. Thus, it can be seen that suitable feeds can be $C_1$ to $C_{30}$ organic acids or their anhydrides wherein the acid is selected from the group consisting of unsubstituted and substituted aliphatic carboxylic acids, unsubstituted and substituted aromatic carboxylic acids and amino acids and wherein the substituent is selected from the group consisting of hydroxy groups and halogen atoms.

Non-limiting examples of suitable saturated aliphatic monocarboxylic acids include propionic, butanoic, valeric, caprylic, capric, lauric, myristic, stearic, carnaubic, isobutyric, pivalic, 2-ethylbutanoic, 2-ethylhexanoic and the like, and their anhydrides.

Suitable saturated aliphatic dicarboxylic acids are, for example, succinic, glutaric, adipic, pimelic, sebacic, and their anhydrides.

Suitable aromatic acids include, by way of example, benzoic, phthalic, terephthalic and the like.

The present invention is also surprisingly effective in the preparation of alcohols from relatively highly branched carboxylic acids. Illustrative of the branched carboxylic acids suitable for use in the process of the present invention are those produced from olefins, carbon monoxide and water in the presence of acidic catalysts. These acids can be produced directly from the foregoing reactants, that is, in a one-step process. An alternate to the one-step method is a reaction carried out in two steps; in the first step, the olefin and carbon monoxide are reacted in the presence of an acidic catalyst, essentially in the absence of water to form an intermediate, hydrolyzable reaction product which is thereafter hydrolyzed in the second stage to liberate the desired carboxylic acid product and the acidic catalyst. Such branched carboxylic acid products may be represented by the structural formula:

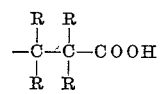

wherein R indicates hydrogen or a substituted or unsubstituted similar or dissimilar alkyl or aralkyl group. Examples of the branched acids produced are: 2,2,3-trimethylbutanoic acid, 2,2-dimethylpentanoic acid, 2-ethyl-2-methylbutanoic acid, and the like.

In general, any low molecular weight, monohydroxy organic alcohol can be reacted with the above acid reactants in the first stage of the process to produce the products of the present invention. Thus, suitable alcohols include the primary, secondary, and tertiary aliphatic, monohydroxy alcohols. While secondary and tertiary alcohols are operable in the process of the present invention, they are found to be less desirable than the primary alcohols because of their stronger tendency to dehydrate to olefins. Such alcohols may contain from 1 to about 6 carbon atoms and preferably contain from 1 to 3 carbon atoms.

Non-limiting examples of suitable alcohols include methyl and ethyl alcohol, the linear and branched propyl-, butyl-, and amyl-, hexyl alcohols and the like.

The present invention may be applied to a specific acid and alcohol of the foregoing classes or mixtures of such acids and such alcohols.

In accordance with the instant invention, a catalyst is provided in both stages of the present process which is not only more active than catalysts heretofore known for the direct reduction of carboxylic acids to alcohols, but is also surprisingly effective for the production of alcohols from highly branched and thus hindered carboxylic acids. The catalyst employed in the practice of the present invention is suitably a molybdenum-containing catalyst such as molybdenum sulfide ($MoS_2$). Other molybdenum-containing catalysts which may be employed include by way of example, molybdenum oxide, sulfided cobalt molybdate, molybdenum blue ($MoO_3$) and the like. These catalysts are truly selective in that the above objects relative to improved reaction rates and selectivity are accomplished. Furthermore, the molybdenum-containing catalysts used in the process of the instant invention are extremely stable and can be used for protracted periods without apparent loss of activity. For example, it has been found in experimental runs that the activity of said catalysts showed no measurable decline after being used over 800 hours. This property is in contrast to the prior art catalysts which are, in general, not stable under the conditions found in the present process and therefore rapidly lose activity with use. Illustrative of this are copper chromite catalysts which are found to be particularly unstable to the water formed during the reaction in the present process.

The catalysts used in the present invention may, of course, be supported on inert carriers of any of the readily available types. Thus, examples of carrier materials which may be used as solid support components of the catalysts are the various aluminous and silicious materials of natural or synthetic origin such as bauxite, aluminum oxide, activated alumina, Kieselguhr, magnesium oxide, magnesium silicate, magnesium carbonate, barium sulphate, pumice, kaolin, activated carbon, clays, silicon carbide, fused alumina, and the like. The non-acidic or weakly acidic carriers are preferred especially in the first stage so as to minimize acid catalyzed alcohol dehydration. The catalysts preferably contain 2-25 wt. percent of the active material supported on a carrier of the type above described, e.g. activated carbon. A preferred molybdenum-containing catalyst is molybdenum sulfide having the following general composition: 5-15 wt. percent, preferably 8-10 wt. percent, e.g. 9 wt. percent molybdenum oxide on a carrier of the type above described, e.g. activated carbon, sufided to saturation with $H_2S$.

The preferred form of the invention involves its application to a continuous process employing two separate reaction vessels. The preferred form is illustrated in the figure.

Referring to the figure, a carboxylic acid and an alcohol as hereinbefore described are initially obtained from a source not shown and are introduced in substantially equimolar amounts into synthesis unit 1, e.g. a low pressure reaction vessel, through line 10. It is found, however, that the presence of large molar excesses of one of the reactants has no deleterious effect. In synthesis unit 1 the reactants are subjected to contact with a molybdenum-containing catalyst as hereinbefore defined, such as, for example, about 8-10% molybdenum sulfide on activated charcoal. The reaction is effected at temperatures of the order of 200° F. to 600° F. and at pressures of from about 200 to 600 p.s.i.g. The products of this reaction, consisting of from about 60 to 98 mole percent or more of ester, depending upon specific conditions and reactant ratios are withdrawn from synthesis unit 1 through line 12 where the desired ester may be withdrawn through line 14 for recovery in a conventional manner. According to the present invention, however, the products comprising the resulting ester are introduced into synthesis unit 2, e.g. high pressure hydrogenation reactor, through line 16. A flow of hydrogen gas is continuously supplied through lines 8 and 16 into said synthesis unit 2. The hydrogen enters the synthesis unit 2 at a temperature which usually ranges from about 200 to 600° F. The volumetric gas rate of hydrogen flow through the synthesis unit is preferably in the order of from 1000 to 10,000 times the volumetric rate of liquid flow through the unit, and as a result, effective mixing of the liquid ester and gaseous hydrogen is brought about in the unit. In synthesis unit 2 the ester and hydrogen reactants are subjected to contact with a molybdenum-containing catalyst similar to that of synthesis unit 1, that is, about 8-10% molybdenum sulfide on activated charcoal for example. The reaction in synthesis unit 2 is effected at temperatures of 300 to 600° F. and at pressures in the range of 500 to 5000 p.s.i.g. to yield the desired alcohol product. The final alcohol-comprising product mixture is withdrawn from synthesis unit 2 through line 20 into separation unit, i.e., still 3 where the resulting product is separated into product alcohol and a low molecular weight alcohol corresponding to the starting alcohol. The product alcohol is recovered in a conventional manner and is drawn off at the bottom of still 3 through line 22. In this step, the low molecular weight alcohol is regenerated and recycled via line 24 to feed line 10 where it is mixed with fresh feed and introduced into synthesis unit 1.

In the above-mentioned figure, reference to certain equipment such as pumps, gages, valves, and the like which obviously would be necessary to operate the process have been omitted. Only sufficient equipment has been diagrammatically shown to illustrate the process and it is intended that no undue limitation be read into the invention by reference to the drawing and description thereof.

The present invention also provides the unique feature in that the crude product from the esterification stage can be reduced directly, i.e., without prior removal of water and trace impurities which may have been present in the initial reactants or subsequently formed in the esterification reaction. Consequently the two-stage process of the invention can be carried out in a single reactor vessel. In this case, the acid and alcohol are introduced in the bottom of the single reactor and are contacted with the molybdenum-containing catalyst which is contained in said reactor. The hydrogen is then introduced at a predetermined distance measured up the reactor side thus resulting in a multi-stage effect. The product alcohol-starting alcohol mixture is withdrawn from the top of the reactor and is recovered in a manner known per se.

Thus, while the process of the present invention is illustrated by representative conditions in which two reaction vessels are employed, it is apparent that such illustration is not intended to limit the scope of the invention in any way. It will also be apparent that other numerous modifications may be made without departing from the scope of the invention.

Specific applications of the process of the present invention are further illustrated by the examples which follow.

*Examples 1 to 4*

In a series of four two-stage runs, substantially equimolar amounts of methanol and neo-heptanoic acid were passed through a catalyst bed of pelletized molybdenum sulfide on activated carbon at the conditions tabulated under the heading "First Stage" in the following Table I. After this first-stage esterification reaction was completed, the resulting esterified product comprising substantially equal volumes of methyl neo-heptanoate and methanol, which represent an excess of the starting lower molecular weight alcohol reactant, was passed into a second reaction vessel which contained a catalyst bed of pelletized molybdenum sulfide on activated carbon similar to that utilized in the first stage along with 2000 volumes of hydrogen. The conditions employed in this second stage hydrogenation step are presented in Table I under the heading "Second Stage." The starting low molecular weight alcohol was recovered and recycled to the first stage. Ester conversion to the desired product alcohol as well as selectivity thereto is presented in the following table.

TABLE I.—METHANOL NEO-HEPTANOIC ACID OVER MoS₂/CHARCOAL CATALYST

| Example No. | First Stage (Ester Formation) | | | | | Second Stage (Hydrogenation) | | | | |
|---|---|---|---|---|---|---|---|---|---|---|
| | Temp. (° F.) | Press. (p.s.i.g.) | Feed Rate (v./v./hr.) | Acid Conv. (percent) | Selectivity (mol percent) | Temp. (° F.) | Press. (p.s.i.g.) | Feed Rate (v./v./hr.) | Ester Conv. (percent) | Neoheptanol Selectivity (mol percent) |
| 1 | 402 | 150 | 0.28 | ~100 | ~100 | 450 | 2,600 | 0.3 | 9.0 | ~100 |
| 2 | 402 | 150 | 0.28 | ~100 | ~100 | 500 | 2,600 | 0.3 | 23.8 | 92.4 |
| 3 | 402 | 150 | 0.28 | ~100 | ~100 | 500 | 2,600 | 0.06 | 71.2 | 90.3 |
| 4 | 402 | 150 | 0.28 | ~100 | ~100 | 525 | 2,600 | 0.3 | 32.1 | 89.2 |

*Examples 5 to 9*

In a manner similar to that of Examples 1 to 4, five additional runs utilizing methanol and neo-heptanoic acid were effected using sulfided cobalt molybdate on activated carbon as catalyst in both stages. As in Examples 1 to 4 the pertinent conditions employed and resulting data are set forth in tabular form in Table II as follows.

to produce the same amount of alcohol directly from the acid. The esterification reaction, which is also quite rapid, may advantageously be carried out in a low cost, low pressure vessel.

*Example 11*

The following experimental data are presented to illustrate the fact that the direct hydrogenation of acids to TABLE II.—METHANOL NEO-HEPTANOIC ACID OVER SULFIDED CoMoO₄/CHARCOAL CATALYST

| Example No. | First Stage (Ester Formation) | | | | | Second Stage (Hydrogenation) | | | | |
|---|---|---|---|---|---|---|---|---|---|---|
| | Temp. (° F.) | Press. (p.s.i.g.) | Feed Rate (v./v./hr.) | Acid Conv. (percent) | Selectivity (mol percent) | Temp. (° F.) | Press. (p.s.i.g.) | Feed Rate (v./v./hr.) | Ester Conv. (percent) | Neoheptanol Selectivity (mol percent) |
| 5 | 451 | 150 | 0.48 | 99.9 | >99 | 450 | 2,600 | 0.3 | 11.7 | 94.8 |
| 6 | 451 | 150 | 0.48 | 99.9 | >99 | 475 | 2,600 | 0.3 | 14.6 | 89.0 |
| 7 | 451 | 150 | 0.48 | 99.9 | >99 | 500 | 2,600 | 0.3 | 36.7 | 84.6 |
| 8 | 451 | 150 | 0.48 | 99.9 | >99 | 500 | 2,600 | 0.15 | 57.0 | 77.0 |
| 9 | 451 | 150 | 0.48 | 99.9 | >99 | 525 | 2,600 | 0.3 | 53.5 | 62.3 |

*Example 10*

In order to illustrate the improved catalyst and reactor utilization relative to direct acid hydrogenation which results from the application of the present invention, rate data based on the conversion of neo-heptanoic acid were calculated and are presented below in Table III.

alcohols is characterized by poor selectivity due to hydrocarbon formation via decarboxylation and to the formation of high boiling esters. As far as possible the conditions utilized in Examples 1 to 9 which illustrated the present invention were employed in these comparative runs. In such runs, therefore, neo-heptanoic acid was re-

TABLE III

| Temp., ° F.[1] | $k_1$—Acid Hydrogenation | $k_2$—Ester Production [2] | $k_3$—Ester Hydrogenation [2] | $k_4$—Alcohol Degradation | $k_5$—Acid Degradation |
|---|---|---|---|---|---|
| 445 | 0.067 | 0.13 | 0.53 | 0.10 | 0 |
| 555 | 0.13 | 0.48 | 0.75 | 0.40 | 0.25 |

[1] Rate constants are for operation under 3,000 p.s.i.g. H₂. These are 1st order with respect to each reactant ex. H₂.
[2] Corresponds to ester of neo-heptanol. Rates for methyl and ethyl esters would be considerably greater.

From the above, it is apparent that the rates of ester production and of ester hydrogenation are several-fold acted directly with hydrogen. The conditions employed as well as the resulting data are set forth in Table IV.

TABLE IV

| Catalyst | MoS₂/Charcoal | | | | | Sulfided CoMoO₄/Charcoal | | |
|---|---|---|---|---|---|---|---|---|
| Run No. | 1 | 2 | 3 | 4 | 5 | 6 | 7 | 8 |
| Temp. (° F.) | 450 | 450 | 450 | 550 | 550 | 450 | 500 | 550 |
| Pressure (p.s.i.g.) | 2,600 | 2,600 | 2,600 | 2,600 | 2,600 | 2,600 | 2,600 | 2,600 |
| Feed Rate (v./v./hr.) | 0.8 | 0.3 | 0.15 | 0.8 | 0.3 | 0.3 | 0.3 | 0.3 |
| Acid Conversion (percent) | 5.5 | 30.9 | 71.2 | 41.5 | 90.4 | 32.8 | 78.4 | 100 |
| Neo-heptanol Selectivity (mol percent) | 54.5 | 55.7 | 44.9 | 17.3 | 21.3 | 34.8 | 35.1 | 34.7 | greater than the rate of direct acid hydrogenation. This feature allows the over-all two-stage acid reduction to be carried to high conversion at low temperatures where the rates of side reactions (hydrocarbon production—$k_4$ and $k_5$) are negligible. Further, because of the high rate of ester reduction, relative to that of direct acid reduction, the size of the high pressure hydrogenation reactor and catalyst charge need be only a fraction of that required Upon comparing the above data with those resulting from the process of the present invention it is apparent that the two-stage conversion of acids to alcohols as taught herein is characterized by remarkably improved selectivity.

It is to be understood that the invention is not to be limited to the exact details of operation shown and described, as obvious modifications and equivalents will be

What is claimed is:

1. A process for the conversion of a $C_1$ to $C_{30}$ organic acid or its anhydride wherein the acid is selected from the group consisting of unsubstituted and substituted aliphatic carboxylic acids, unsubsttiuted and substituted aromatic carboxylic acids and amino acids and wherein the substituent is selected from the group consisting of hydroxy groups and halogen atoms to an alcohol having the same number of carbon atoms which comprises contacting said acid or anhydride with a $C_1$ to $C_6$ alkanol at temperatures of about 200 to 600° F. and pressures of about 200 to 600 p.s.i.g. in the presence of a catalyst containing a catalytic amount of a molybdenum sulfide in a first reaction stage to produce an esterified product corresponding to said organic acid and said alkanol, introducing at least a portion of said esterified product into a second reaction stage, contacting said esterified product with hydrogen in said second stage in the presence of a catalyst containing a catalytic amount of molybdenum sulfide at temperatures of about 300 to 600° F. and pressures of about 500 to 5,000 p.s.i.g. to produce an alcohol product-comprising mixture, separating the alcohol product from such mixture and separating and recycling at least a portion of said $C_1$ to $C_6$ alkanol contained in said mixture to the first reaction stage.

2. The process of claim 1 in which the catalyst in each stage is molybdenum sulfide on activated carbon.

3. A process for the production of neo-heptanol from neo-heptanoic acid which comprises contacting equimolar amounts of neo-heptanoic acid with methanol at temperatures of 200 to 600° F. and pressures of 200 to 600 p.s.i.g. in the presence of a catalyst containing a catalytic amount of an 8–10% molybdenum sulfide on activated carbon in a first reaction vessel to produce methyl neo-heptanoate, introducing at least a portion of said methyl neo-heptanoate into a second reaction vessel, contacting said methyl neo-heptanoate with hydrogen in said second vessel at temperatures of 300 to 600° F. and pressures of 500 to 5,000 p.s.i.g. in the presence of a catalyst containing a catalytic amount of 8–10% molybdenum sulfide on activated carbon to produce a neo-heptanol comprising mixture, separating said neo-heptanol from said mixture and separating and recycling at least a portion of the methanol contained in said mixture to the first reaction vessel.

4. A process as in claim 1 wherein said $C_1$ to $C_6$ alkanol is employed in equimolar amounts with said $C_1$ to $C_{30}$ organic acid and said catalyst is on an inert carrier in both stages.

5. A process as in claim 1 wherein said organic acid is highly branched.

References Cited

UNITED STATES PATENTS

| | | | |
|---|---|---|---|
| 2,440,678 | 5/1948 | Ford et al. | 260—638 |
| 2,584,531 | 2/1952 | Arnold et al. | 260—488 |
| 2,813,911 | 11/1957 | Mason et al. | 252—439 |
| 3,173,959 | 3/1965 | Rittmeister | 260—638 |

LEON ZITVER, *Primary Examiner.*

J. E. EVANS, *Assistant Examiner.*